(No Model.)
F. H. TRUMBULL.
LIQUID DISPENSING APPARATUS.
No. 575,446. Patented Jan. 19, 1897.
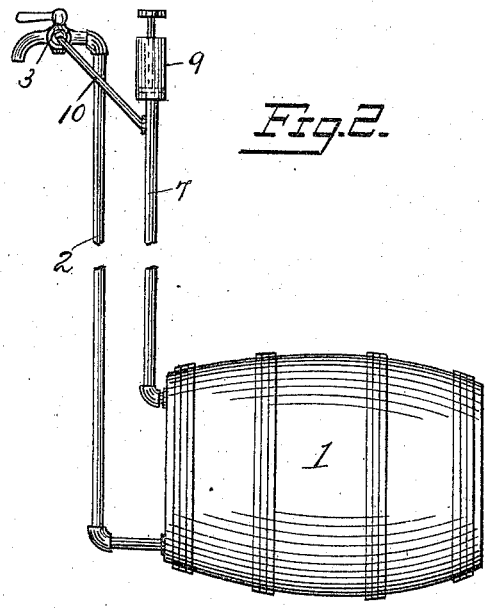
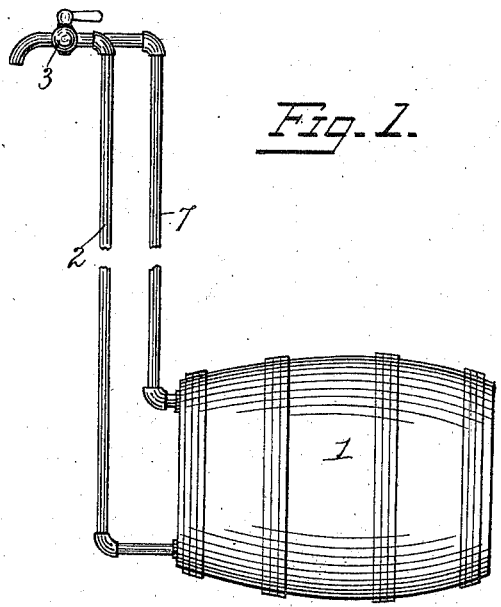
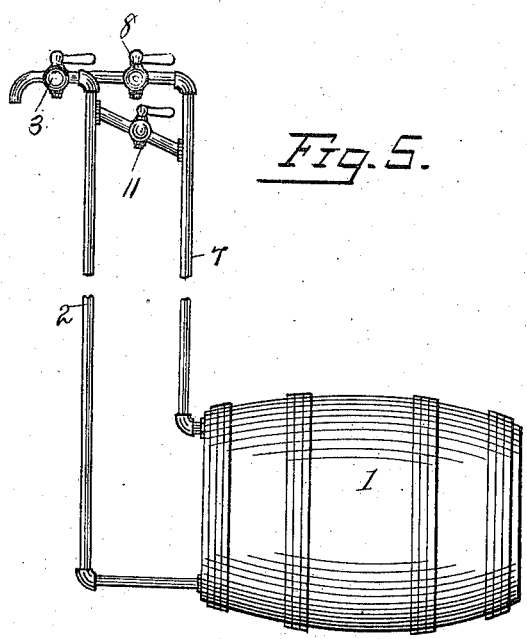
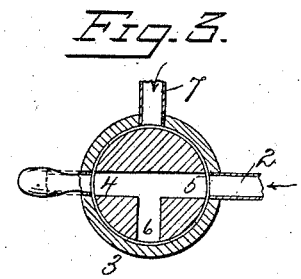
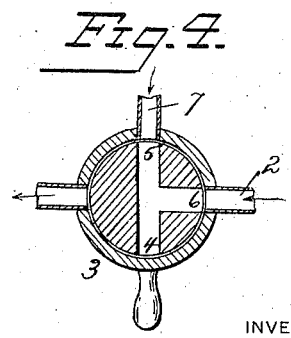
WITNESSES,
Albert Popkins.
Harry J. Davis.
INVENTOR
Frank H. Trumbull
by
Benj. R. Catlin atty.
THE NORRIS PETERS CO., PHOTO-LITHO., WASHINGTON, D. C.

UNITED STATES PATENT OFFICE.

FRANK H. TRUMBULL, OF PALMYRA, NEW YORK, ASSIGNOR OF ONE-HALF TO W. J. HENNESSY, OF SAME PLACE.

LIQUID-DISPENSING APPARATUS.

SPECIFICATION forming part of Letters Patent No. 575,446, dated January 19, 1897.

Application filed March 2, 1896. Serial No. 581,547. (No model.)

*To all whom it may concern:*

Be it known that I, FRANK H. TRUMBULL, a resident of Palmyra, in the county of Wayne and State of New York, have invented certain new and useful Improvements in Pneumatic Faucets for Ale, Beer, and other Liquids; and I do hereby declare the following to be a full, clear, and exact description of the invention, such as will enable others skilled in the art to which it pertains to make and use the same.

The invention relates to dispensing liquids, and particularly ale, beer, wine, and other like carbonated beverages; and its object is to provide economical and conveniently-operated devices whereby the pressure in the barrel, cask, or other receptacle and that above the liquid contents of the draw-off pipe shall be equalized to permit the liquid in said pipe to fall to the level of that in the receptacle; and the invention consists in the construction hereinafter described and particularly pointed out.

In the accompanying drawings, Figure 1 is a side elevation of a beer-barrel with the improvement attached. Fig. 2 is a like view of a modification. Figs. 3 and 4 are sections of three-way cocks, and Fig. 5 is a partial elevation of a modified detail.

Numeral 1 indicates a holder for liquids under pressure above the normal. The particular form and capacity of the holder are immaterial, and the invention is not limited to use with any particular liquid, though beer and ale are primarily contemplated.

2 denotes a draw-off pipe which in practice usually extends above the holder or barrel and frequently to another floor, as from a cellar to a room above. Ordinarily when a glass of beer, for example, has been drawn and the faucet-cock closed the beer remains in the pipe, which is therefore full from the barrel to the cock-plug. A carbonated beverage standing for any considerable time in a pipe becomes stale, and particularly if the pipe is situated wholly or partly in a warm room. It is customary to draw such stale beer and treat it as waste or otherwise dispose of it in order that customers may be served with a cool lively draft directly from the barrel. Such disposition of stale beer occasions a considerable loss in addition to the delay and annoyance caused by the necessity of drawing it off preparatory to serving a customer with that which is better. To prevent this evil, the pressure above the beer in the barrel and above that in the pipe is equalized by the means to be described.

3 denotes a faucet having a three-way cock. The parts or conduits of the cock are indicated by 4, 5, and 6, though the arrangement of these may be varied to some extent. When the cock is turned as indicated in Fig. 3, the faucet-passage is in free communication with the interior of the barrel through the ports 4 and 5, the port 6 being closed, except through the faucet to the open air. By turning the cock to the position indicated in Fig. 4 to cut off the flow of beer the draw-off pipe is put in communication through ports 5 and 6 with the interior of a pipe 7, that communicates with the interior of the barrel, whereby gas or air passes freely to the top of the liquid column in the draw-off pipe and equalizes the pressure, so that the liquid in said pipe falls by gravity to the level of that in the barrel.

The cock is so constructed and the pipes so arranged that the desired result is effected by simply turning off the beer, as usual when a glass or measure has been filled.

In case beer is frequently drawn, as may happen during parts of the day or on particular days, the contents of the pipe will not always be liable to be sufficiently impaired to render the use of the described device necessary, and a distinct stop-cock 8 may be provided in the pressure-equalizing pipe 7 to render such pipe inoperative at will.

The pipe 7, connecting a pump 9, for forcing air or gas into the barrel can be utilized for the purposes of the invention by connecting it with the port 6 of the faucet-cock by a branch 10, (see Fig. 2,) the construction being such that pressure may be equalized as above described, and this and other such like arrangements are within the invention; and, further, a separate cock might be provided for opening communication between the barrel and the draw-off pipe, as indicated in Fig. 5, in which 11 denotes a cock by which pipe 7, leading either directly or mediately to the barrel, can be put in communication with the upper end of the draw-off pipe below the faucet-cock.

More complex devices have been proposed for a purpose having resemblance to that contemplated herein. My improvement is characterized by a combination, hereinafter pointed out, of a faucet having an automatic discharge by gravity on the delivery side of the cock, a receptacle holding fluids under pressure, and pipes whereby the closing of the liquid-discharge port of the cock equalizes pressure in the pipes and receptacle, both the faucet-discharge and the discharge-pipe back of the faucet-cock being emptied of liquid, as set forth.

Having described my invention, what I claim is—

1. In combination with a holder for a liquid under pressure above the normal, a draw-off pipe extending upwardly from said barrel, a faucet having a discharge-passage continuously in or extending below the plane of the faucet and provided with a cock having ports whereby the draw-off pipe can be alternately put in communication with the said horizontal faucet-discharge and with a pipe leading to the barrel above the liquid therein, and means for equalizing the pressure in the barrel and above the liquid in said pipe, said means consisting of a pressure-equalizing conduit connected to communicate through the faucet-cock with the barrel whereby the interior of the barrel above the liquid and the upper portion of the liquid-discharge pipe immediately at the faucet-cock may be made to communicate and whereby the discharge-conduits on both sides of the faucet may be emptied of their liquid contents by a simple manipulation of the cock, substantially as described.

2. In combination with a holder for liquid under pressure above the normal, a draw-off pipe extending upwardly from said barrel, a faucet having a discharge-passage continuously in or extending below the plane of the faucet and provided with a three-way cock, a pipe having a horizontal faucet-discharge conduit and connecting said cock with the upper part of the barrel, a pipe connecting the same cock with the draw-off pipe, said cock being adapted to simultaneously close the faucet-discharge and open communication between said pipes through its ports, and a supplementary pipe provided with a cock and connecting the two first-named pipes above the barrel and adjacent the draw-off cock, substantially as described.

In testimony whereof I have signed this specification in the presence of two subscribing witnesses.

FRANK H. TRUMBULL.

Witnesses:
HATTIE P. MILNE,
BESS MILNE.